(12) United States Patent
Artama et al.

(10) Patent No.: US 12,379,103 B2
(45) Date of Patent: Aug. 5, 2025

(54) ELECTRICAL DEVICE INCLUDING SUBSTRATE WITH ELECTRICALLY OPERABLE LIGHT SOURCE

(71) Applicant: PILKINGTON AUTOMOTIVE FINLAND OY, Tampere (FI)

(72) Inventors: Juha Artama, Tampere (FI); Janne Ilonen, Tampere (FI)

(73) Assignee: Pilkington Automotive Finland Oy, Tampere (FI)

( * ) Notice: Subject to any disclaimer, the term of this patent is extended or adjusted under 35 U.S.C. 154(b) by 0 days.

(21) Appl. No.: 18/465,249

(22) Filed: Sep. 12, 2023

(65) Prior Publication Data

US 2023/0417404 A1 Dec. 28, 2023

Related U.S. Application Data

(62) Division of application No. 16/644,350, filed as application No. PCT/EP2018/074519 on Sep. 11, 2018, now Pat. No. 11,788,720.

(30) Foreign Application Priority Data

Sep. 11, 2017 (GB) .................................. 1714590

(51) Int. Cl.
*F21V 33/00* (2006.01)
*B32B 7/12* (2006.01)
(Continued)

(52) U.S. Cl.
CPC .............. *F21V 33/006* (2013.01); *B32B 7/12* (2013.01); *B32B 17/10036* (2013.01);
(Continued)

(58) Field of Classification Search
CPC ............. F21V 33/006; B32B 17/10036; B32B 17/10541; B32B 17/10761; G02B 5/208; G02B 5/26
See application file for complete search history.

(56) References Cited

U.S. PATENT DOCUMENTS

| | | | |
|---|---|---|---|
| 2007/0003503 A1 | 1/2007 | Sabetsky | |
| 2007/0053088 A1 | 3/2007 | Kranz et al. | |

(Continued)

FOREIGN PATENT DOCUMENTS

| | | |
|---|---|---|
| CN | 1836177 A | 9/2006 |
| CN | 101454155 A | 6/2009 |

(Continued)

OTHER PUBLICATIONS

International Search Report (PCT/ISA/210) and Written Opinion (PCT/ISA/237) mailed on Jan. 3, 2019, by the European Patent Office as the International Searching Authority for International Application No. PCT/EP2018/074519.

(Continued)

*Primary Examiner* — Maria V Ewald
*Assistant Examiner* — Ethan Weydemeyer
(74) *Attorney, Agent, or Firm* — BUCHANAN INGERSOLL & ROONEY PC (57) ABSTRACT

An electrical device includes a substrate; at least two electrically conductive pathways directly on a first major surface of the substrate and in electrical communication with an electrically operable light source on the substrate; and an infrared radiation reflecting film on at least a portion of a second major surface of the substrate, the infrared radiation reflecting film configured to reduce the amount of infrared radiation that passes from the second major surface of the substrate to the first major surface of the substrate. The at least two electrically conductive pathways include a first (Continued)

electrically conductive pathway and a second electrically conductive pathway arranged such that upon electrically connecting the first and second electrically conductive pathways to a power supply, the electrically operable light source switches on.

9 Claims, 6 Drawing Sheets (51) Int. Cl.
    *B32B 17/10*     (2006.01)
    *G02B 5/20*     (2006.01)
    *G02B 5/26*     (2006.01)
    *B60J 1/00*     (2006.01)
    *B60Q 3/208*     (2017.01)
    *F21Y 115/10*     (2016.01)

(52) U.S. Cl.
    CPC .. *B32B 17/10541* (2013.01); *B32B 17/10761* (2013.01); *G02B 5/208* (2013.01); *G02B 5/26* (2013.01); *B32B 17/10449* (2013.01); *B32B 2605/00* (2013.01); *B60J 1/001* (2013.01); *B60Q 3/208* (2017.02); *F21Y 2115/10* (2016.08)

(56) References Cited

U.S. PATENT DOCUMENTS

| | | |
|---|---|---|
| 2009/0046355 A1 | 2/2009 | Derda |
| 2009/0114928 A1 | 5/2009 | Messere et al. |
| 2010/0165436 A1 | 7/2010 | Voss et al. |
| 2011/0070417 A1 | 3/2011 | Reutler et al. |
| 2013/0038206 A1 | 2/2013 | Aurongzeb |
| 2014/0113120 A1* | 4/2014 | Thiel ............... C03C 17/366 428/448 |
| 2014/0198389 A1 | 7/2014 | Laurent et al. |
| 2015/0321950 A1 | 11/2015 | Fischer et al. |
| 2016/0020399 A1 | 1/2016 | Jung et al. |
| 2016/0052446 A1 | 2/2016 | Frey et al. |
| 2016/0075111 A1 | 3/2016 | Dixon |
| 2016/0325529 A1 | 11/2016 | Linthout et al. |
| 2017/0218685 A1 | 8/2017 | Kuhn et al. |
| 2020/0386398 A1 | 12/2020 | Artama et al. |

FOREIGN PATENT DOCUMENTS

| | | |
|---|---|---|
| CN | 102036930 A | 4/2011 |
| CN | 102830175 A | 12/2012 |
| CN | 102751440 B | 6/2015 |
| CN | 104870392 A | 8/2015 |
| CN | 105263706 A | 1/2016 |
| CN | 106715351 A | 5/2017 |
| JP | 2009512977 A | 3/2009 |
| JP | 2009534245 A | 9/2009 |
| JP | 2010232041 A | 10/2010 |
| JP | 2011245705 A | 12/2011 |
| JP | 2014082217 A | 5/2014 |
| JP | 2014525647 A | 9/2014 |
| JP | 2017507874 A | 3/2017 |
| WO | 2004009349 A1 | 1/2004 |
| WO | 2004062908 A2 | 7/2004 |
| WO | 2007077239 A1 | 7/2007 |
| WO | 2007122426 A1 | 11/2007 |
| WO | 2013022557 A1 | 2/2013 |

OTHER PUBLICATIONS

Office Action (Notice of Reasons for Refusal) issued May 24, 2022, by the Japanese Patent Office in corresponding Japanese Patent Application No. 2020-535306 and an English Translation of the Office Action. (14 pages).

Office Action (Notification of the First Office Action) issued May 27, 2022, by the China National Intellectual Property Administration in corresponding Chinese Patent Application No. 201880058796.2 and an English Translation of the Office Action.

Search Report mailed on Feb. 14, 2018 by the British Patent Office for Application No. 1714590.5.

* cited by examiner

ELECTRICAL DEVICE INCLUDING SUBSTRATE WITH ELECTRICALLY OPERABLE LIGHT SOURCE

The present application is a divisional application of U.S. patent application Ser. No. 16/644,350, filed Mar. 4, 2020, which is a U.S. National Stage Application of PCT/EP2018/074519, filed Sep. 11, 2018, which claims priority of GB 1714590.5, filed Sep. 11, 2017. The entire contents of U.S. patent application Ser. No. 16/644,350, PCT/EP2018/074519 and GB 1714590.5 are incorporated herein by reference in their entirety.

The present invention relates to glazings comprising a pane of glazing material and an electrically operable light source on a substrate and to an electrical device useful in making such glazings.

Laminated glazings are well known and typically comprise two glass plies joined together by means of a ply of adhesive interlayer material such as polyvinyl butyral (PVB).

It is known to incorporate light emitting diodes in between two glass panes of a laminated glazing. It is known to attach the light emitting diodes to an electrically conductive coating provided on one of the glass panes, as in WO2004/062908A2.

US2009/0114928A1 describes a luminous structure based on light-emitting diodes, which includes: a first dielectric element with a substantially plane main face associated with a first electrode; a second dielectric element with a substantially plane main face associated with a second electrode that faces the first electrode and lies in a different plane; at least a first light-emitting diode including a semiconductor chip including, on first and second opposed faces, first and second electrical contacts, the first electrical contact being electrically connected to the first electrode, the second electrical contact being electrically connected to the second electrode, and at least the first element at least partly transmitting radiation within the ultraviolet or in the visible.

US2016/0020399A1 describes an organic light-emitting diode (OLED) display and a method of manufacturing the same.

JP2014082217A describes an organic EL device comprising an organic EL panel comprising an organic EL element; and a selective reflection film.

CN102751440 describes a flexible organic electroluminescent device comprising a polymer film substrate, an anode, an organic electroluminescent layer and a cathode which are sequentially laminated together.

It is also known to mount a light emitting diode on a circuit board and to laminate the circuit board between two glass plies as in WO2004/009349A1. The circuit board described in WO2004/009349A1 includes a flexible circuit comprising a substrate and a conductive layer. The substrate may comprise polyester and the conductive layer may be a conductive ink which is in direct contact with the substrate.

JP2011-245705A describes a heat ray shielding film manufactured by forming a heat ray shielding layer and an adhesive layer on a surface of a transparent plastic film to provide a heat ray shielding film which is used by sticking to glass and free from poor appearance even when film temperature becomes high by irradiation of sunlight.

US2017/0003503A1 describes a thermoplastic film for a laminated-glass pane having a non-linear continuous wedge insert in the vertical direction in some sections. The thermoplastic film has a continuous non-linear wedge angle profile having a first section, which has a wedge angle that is constant or that is variable at least in some sections in order to avoid double images in transmission.

It is known from WO2007/122426A1 that electroluminescent materials are sensitive to temperature. When an electroluminescent lamp is laminated between two glass panes, an infrared radiation reflecting means is provided between the glass panes for reducing the amount of infrared radiation that may otherwise be incident upon the electroluminescent lamp. The infrared radiation reflecting means may be provided as a coating on one of the glass panes, or on a ply of interlayer material of the type used to join the glass sheets together, or on a further ply of interlayer material such as a ply of polyethylene terephthalate ("PET") specifically provided as a substrate for the film.

A problem with such prior art solutions is that by providing an infrared radiation reflecting film that is not on one of the glass panes, in order to incorporate such a film into the laminated glazing at least two plies of adhesive interlayer material are required, one either side of the film. The electrical device may then be positioned between one of these two plies of adhesive interlayer material and another ply of adhesive interlayer material provided for joining to a glass pane. As such at least three plies of adhesive interlayer material are required, especially when the electrical device and the infrared radiation are coextensive with the glass panes.

Accordingly the present invention provides from a first aspect a laminated glazing comprising a first pane of glazing material, a second pane of glazing material, a first ply of adhesive interlayer material, a second ply of adhesive interlayer material and an electrical device, wherein the first and second plies of adhesive interlayer material and the electrical device are between the first and second panes of glazing material, the electrical device is between the first and second plies of adhesive interlayer material and the electrical device comprises a substrate having a first major surface and a second opposing major surface, further wherein on the first major surface of the substrate are one or more electrically conductive pathways in electrical communication with at least one (a first) electrically operable light source mounted on the substrate, and on at least a portion of the second major surface of the substrate is an infrared radiation reflecting film for reducing the amount of infrared radiation that passes from the second major surface of the substrate to the first major surface of the substrate.

By providing a substrate having on one side thereof electrically conductive pathways and on the other side thereof an infrared radiation reflecting film, it is much easier to incorporate the electrical device into a laminated glazing whilst maintaining adequate interfacial lamination between the individual layers of the laminated glazing. In accordance with the present invention, the same substrate is used both to mount the electrically operable light sources thereon (on one side of the substrate) and as the carrier ply for the infrared radiation reflecting film (on the opposite side of the substrate). By having the infrared radiation reflecting film on at least a portion of the second major surface of the substrate, it is not necessary to use a separate carrier ply carrying such a film, or a sheet of glazing material carrying such a film (as a coating) when incorporating the electrical device into the laminated glazing.

The provision of the infrared radiation reflecting film also provides the laminated glazing with a solar control function, which may be useful in certain automotive and architectural applications.

Preferably the electrically operable light source is a light emitting diode. For the avoidance of doubt, preferably the laminated glazing comprises a first pane of glazing material, a second pane of glazing material, a first ply of adhesive interlayer material, a second ply of adhesive interlayer material and an electrical device, wherein the first and second plies of adhesive interlayer material and the electrical device are between the first and second panes of glazing material, the electrical device is between the first and second plies of adhesive interlayer material and the electrical device comprises a substrate having a first major surface and a second opposing major surface, further wherein on the first major surface of the substrate are one or more electrically conductive pathways in electrical communication with at least one (a first) light emitting diode mounted on the substrate and on at least a portion of the second major surface of the substrate is an infrared radiation reflecting film for reducing the amount of infrared radiation that passes from the second major surface of the substrate to the first major surface of the substrate.

Preferably the substrate is monolithic. When the substrate is monolithic the substrate is a single sheet of material and not a plurality of sheets of different material joined together as in a laminate (such as two sheets of glass joined together by a sheet of polyvinyl butyral).

Preferably the substrate comprises a polyester.

Preferably the substrate comprises polyethylene terephthalate (PET).

Preferably the substrate is a sheet of plastic, more preferably a sheet of PET.

Preferably the substrate is optically transparent. The optical wavelength region is between 380 nm and 780 nm.

Preferably at least one of the first and second plies of adhesive interlayer material comprises polyvinyl butyral.

Preferably at least one of the first and second plies of adhesive interlayer material comprises a copolymer of ethylene, such as ethylene vinyl acetate (EVA).

Preferably at least one of the first and second plies of adhesive interlayer material comprises polyurethane, in particular a thermoplastic polyurethane (TPU).

Preferably at least one of the first and second plies of adhesive interlayer material comprises an ionoplast interlayer material such as SentryGlas® from Dupont.

Preferably the laminated glazing is curved in at least one direction. Preferably the radius of curvature in the at least one direction is between 500 mm and 20000 mm, more preferably between 1000 mm and 8000 mm.

Preferably the first and/or second pane of glazing material comprises glass, more preferably soda-lime-silica glass. A typical soda-lime-silica glass composition is (by weight), $SiO_2$ 69-74%; $Al_2O_3$ 0-3%; $Na_2O$ 10-16%; $K_2O$ 0-5%; MgO 0-6%; CaO 5-14%; $SO_3$ 0-2%; $Fe_2O_3$ 0.005-2%. The glass composition may also contain other additives, for example, refining aids, which would normally be present in an amount of up to 2%.

Preferably the infrared radiation reflecting film is in direct contact with the second major surface of the substrate.

Preferably at least one of the one or more electrically conductive pathways is in direct contact with the first major surface of the substrate.

Preferably the laminated glazing is part of an automotive glazing, such as a windscreen, side window, rear window or roof window i.e. a sunroof.

Preferably the first electrically operable light source is mounted on the first major surface of the substrate.

Preferably the first electrically operable light source is arranged on the first major surface of the substrate to emit a beam of light away from the first major surface of the substrate.

Preferably the first electrically operable light source is arranged on the first major surface of the substrate to emit a beam of light away from the first major surface of the substrate and not towards the second major surface of the substrate.

Preferably the first electrically operable light source is arranged on the first major surface of the substrate to emit a beam of light towards the second major surface of the substrate.

Preferably there are at least two (a first and a second) electrically conductive pathways on the first major surface of the substrate arranged such that upon electrically connecting the first and second electrically conductive pathways to a suitable power supply, the at least one electrically operable light source switches on to emit a beam of light. Preferably the first and/or second electrically conductive pathway comprises an electrically conductive ink. Preferably the electrically conductive ink is optically opaque.

Preferably the electrical device comprises a plurality of electrically operable light sources, in particular, a plurality of light emitting diodes, on the first major surface of the substrate, each electrically operable light source being in electrical communication with at least one electrically conductive pathway on the first major surface of the substrate. Preferably the plurality of electrically operable light sources on the first major surface of the substrate are arranged in a matrix format. Preferably the plurality of electrically operable light sources comprises at least one electrically operable light source for emitting light in a first wavelength range and at least one electrically operable light source for emitting light in a second wavelength range different to the first wavelength range. Preferably each of the electrically operable light sources in the plurality of electrically operable light sources are the same type.

Preferably the infrared radiation reflecting film is on the entire second major surface of the substrate.

In some embodiments the infrared radiation reflecting film comprises at least one layer comprising a metal, in particular silver.

In some embodiments the infrared radiation reflecting film comprises one or more metallic layers (or metal oxide layers) and one or more dielectric layers, typically forming a multilayer stack. The multilayer stack structure may be repeated to enhance the reflectivity of the film. Amongst other similar metals, silver, gold, copper, nickel and chromium may be used as the metallic layer in a multilayer stack; indium oxide, antimony oxide or the like may be used as the metal oxide layer. Films comprising one or two layers of silver interleaved between layers of a dielectric such as an oxide of silicon, aluminium, titanium, vanadium, tin or zinc are typical multilayer stacks. Generally, the one or more layers from which the infrared reflective film is formed are of the order of tens of nanometres in thickness.

As an alternative to the (metal/dielectric)n based film described above, the infrared radiation reflecting film may include a plurality of non-metallic layers, such that it functions as a band filter (the band being focused on the near infrared region of the electromagnetic spectrum).

In some embodiments the infrared radiation reflecting film is in direct contact with the second major surface of the substrate.

In some embodiments the substrate comprises one or more coating layers on the second major surface thereof, and the infrared radiation reflecting film is on the one or more coating layers. In such embodiments, the one or more coating layers on the second major surface of the substrate may be considered to form part of the infrared radiation reflecting film.

From a second aspect the present invention provides an electrical device comprising a substrate having a first major surface and a second opposing major surface, wherein on the first major surface of the substrate are one or more electrically conductive pathways in electrical communication with at least one (a first) electrically operable light source on the substrate and on at least a portion of the second major surface of the substrate is an infrared radiation reflecting film for reducing the amount of infrared radiation that passes from the second major surface of the substrate to the first major surface of the substrate.

By having the infrared radiation film on at least a portion of the second major surface of the substrate that is used to carry the first electrically operable light source, it is not necessary to use a separate carrier ply carrying such a film, or a sheet of glazing material carrying such a film as a coating on a major surface thereof when incorporating the electrical device into a glazing, for example of the type described with reference to the first aspect of the present invention.

Preferably the infrared radiation reflecting film is on the entire second major surface of the substrate.

Preferably the first electrically operable light source is a light emitting diode. For the avoidance of doubt, preferably the electrical device comprises a substrate having a first major surface and a second opposing major surface, wherein on the first major surface of the substrate are one or more electrically conductive pathways in electrical communication with at least one (a first) light emitting diode mounted on the substrate and on at least a portion of the second major surface of the substrate is an infrared radiation reflecting film for reducing the amount of infrared radiation that passes from the second major surface of the substrate to the first major surface of the substrate.

Preferably the substrate is monolithic. When the substrate is monolithic the substrate consists of a single sheet of material and not a plurality of sheets of different material joined together as in a laminate (such as two sheets of glass joined together by a sheet of polyvinyl butyral).

Preferably the substrate comprises polyester.

Preferably the substrate comprises polyethylene terephthalate (PET).

Preferably the substrate is a sheet of plastic, more preferably a sheet of PET.

Preferably the infrared radiation reflecting film is in direct contact with the second major surface of the substrate.

Preferably at least one of the one or more electrically conductive pathways is in direct contact with the first major surface of the substrate.

Preferably the infrared radiation reflecting film comprises at least one layer comprising a metal, more preferably silver or gold.

Preferably the infrared radiation reflecting film comprises one or more metallic layers (or metal oxide layers) and one or more dielectric layers, typically forming a multilayer stack. The multilayer stack structure may be repeated to enhance the reflectivity of the film. Amongst other similar metals, silver, gold, copper, nickel and chromium may be used as the metallic layer in a multilayer stack; indium oxide, antimony oxide or the like may be used as the metal oxide layer. Films comprising one or two layers of silver interleaved between layers of a dielectric such as an oxide of silicon, aluminium, titanium, vanadium, tin or zinc are typical multilayer stacks. Generally, the one or more layers from which the infrared reflective film is formed are of the order of tens of nanometres in thickness.

As an alternative to the (metal/dielectric) based film described above, the infrared radiation reflecting film may include a plurality of non-metallic layers, such that it functions as a band filter (the band being focused on the near infrared region of the electromagnetic spectrum).

Preferably the first electrically operable light source is mounted on the first major surface of the substrate.

In some embodiments the substrate comprises one or more coating layers on the second major surface thereof, and the infrared radiation reflecting film is on the one or more coating layers. In such embodiments, the one or more coating layers on the second major surface of the substrate may be considered to form part of the infrared radiation reflecting film.

From a third aspect the present invention provides an assembly for a glazing, in particular a window, the assembly comprising an electrical device according to the second aspect of the present invention and at least one pane of glazing material.

Preferably the assembly comprises means for attaching the electrical device to the at least one pane of glazing material.

Preferably the assembly comprises at least one ply of adhesive interlayer material for attaching the electrical device to the at least one pane of glazing material.

From a fourth aspect the present invention provides a glazing pane comprising an electrical device according to the second aspect of the present invention and a pane of glazing material, in particular glass, wherein the electrical device is attached to the pane of glazing material by at least one ply of adhesive interlayer material.

Preferably the at least one ply of adhesive interlayer material comprises polyvinyl butyral.

Preferably the at least one ply of adhesive interlayer material comprises a copolymer of ethylene, such as ethylene vinyl acetate (EVA).

Preferably the at least one ply of adhesive interlayer material comprises polyurethane, in particular a thermoplastic polyurethane (TPU).

Preferably the at least one ply of adhesive interlayer material comprises an ionoplast interlayer material such as SentryGlas® from Dupont.

From a fifth aspect the present aspect the present invention provides a method of making a laminated glazing comprising the steps (i) providing an unlaminated stack comprising, in the following sequence, a first pane of glazing material, a first ply of adhesive interlayer material, an electrical device, a second ply of adhesive interlayer material and a second pane of glazing material, wherein the electrical device is an electrical device according to the second aspect of the present invention, and (ii) laminating together the unlaminated stack to join the first pane of glazing material to the second pane of glazing material.

Preferably the unlaminated stack is laminated at a temperature of about 100° C. to 150° C.

Preferably the unlaminated stack is laminated at a pressure of about 5 to 15 atmospheres.

Preferably the first and/or second pane of glazing material comprises glass, in particular soda-lime-silica glass.

Preferably the first and/or second pane of glazing material is a monolithic sheet of glass, in particular soda-lime-silica glass.

The invention will now be described with reference to the following figures (not to scale) in which.

Figure 1:
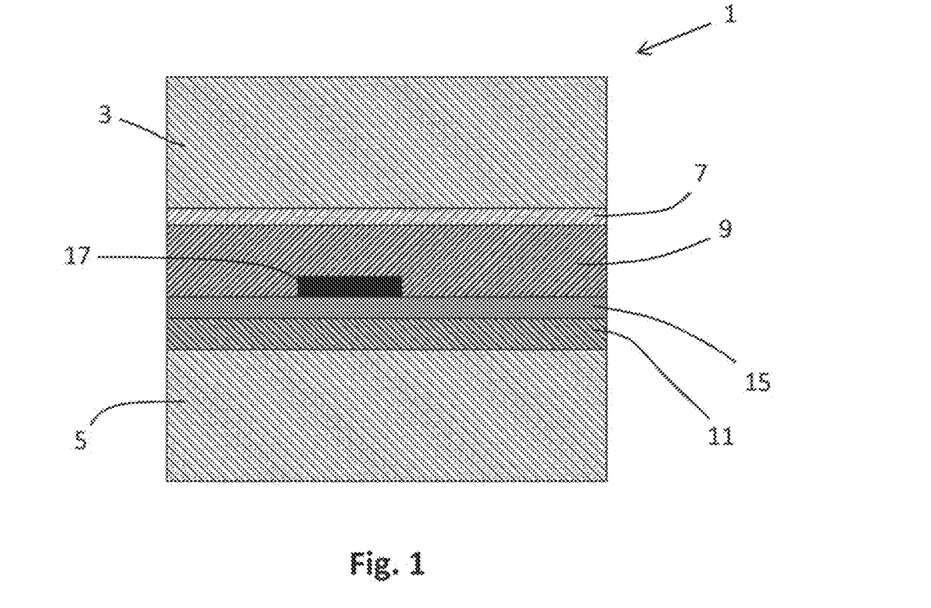
FIG. 1 shows a schematic cross-sectional view of a known laminated glazing incorporating a light emitting diode mounted on a circuit board.
Figure 2:
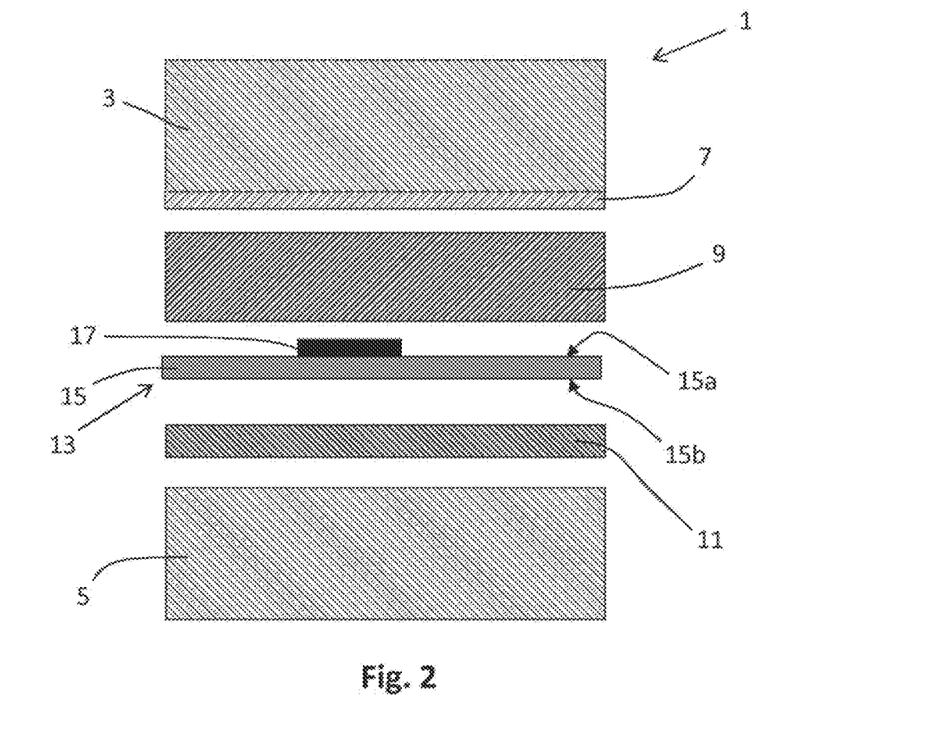
FIG. 2 shows a schematic exploded cross-sectional view of the laminated glazing shown in FIG. 1.

With reference to FIGS. 1 and 2, there is shown a laminated glazing 1 comprising a first pane of glass 3 joined to a second pane of glass 5 by means of first and second plies of polyvinyl butyral (PVB) 9, 11. Between the first and second plies of PVB 9, 11 is an electrical device 13 comprising a substrate 15 having first and second opposing major surfaces 15a, 15b. The substrate 15 is an optically transparent sheet of polyethylene terephthalate (PET) having a thickness of 0.1 mm-0.2 mm.

A light emitting diode 17 is mounted on the first major surface 15a of the substrate 15. As is known in the art, a light emitting diode is an electrically operable light source. The light emitting diode 17 has a first electrical input and a second electrical input such that upon bringing the first electrical input of the light emitting diode 17 into electrical communication with a first output terminal of a suitable electrical power supply, and bringing the second electrical input of the light emitting diode 17 into electrical communication with a second output terminal of the suitable power supply, electrical power is provided to the light emitting diode to switch the light emitting diode 17 "on" i.e. the light emitting diode goes from an unenergized state wherein no light is emitted by the light emitting diode to an energised state wherein light is emitted by the light emitting diode.

Electrically conductive pathways (not shown) are on the first major surface 15a and are in electrical communication with the electrical inputs of the light emitting diode 17 for providing electrical power thereto. Suitably the electrically conductive pathways are an electrically conductive ink applied to the first major surface 15a by means of a printing process, such as screen printing or inkjet printing such that the electrically conductive pathways are in direct contact with the first major surface 15a of the substrate 15.

The first pane of glass 3 has an optically transparent solar control coating 7 on a major surface thereof facing the first ply of PVB 9. The solar control coating 7 comprises an infrared radiation reflecting film of a type known in the art and may comprise at least one layer of silver. In the art, the pane of glass 3 with optically transparent solar control coating 7 on a major surface thereof are well known would be usually be referred to as a coated glass pane, or a coated glass sheet. The ply of PVB 9 is needed to bond the coated glass pane to the first major surface 15a of the substrate 15 because the solar control coating 7 and the substrate 15 are not adhesive. Likewise, the ply of PVB 11 is needed to bond the second glass pane to the second major surface 15b of the substrate 15.

Figure 3:
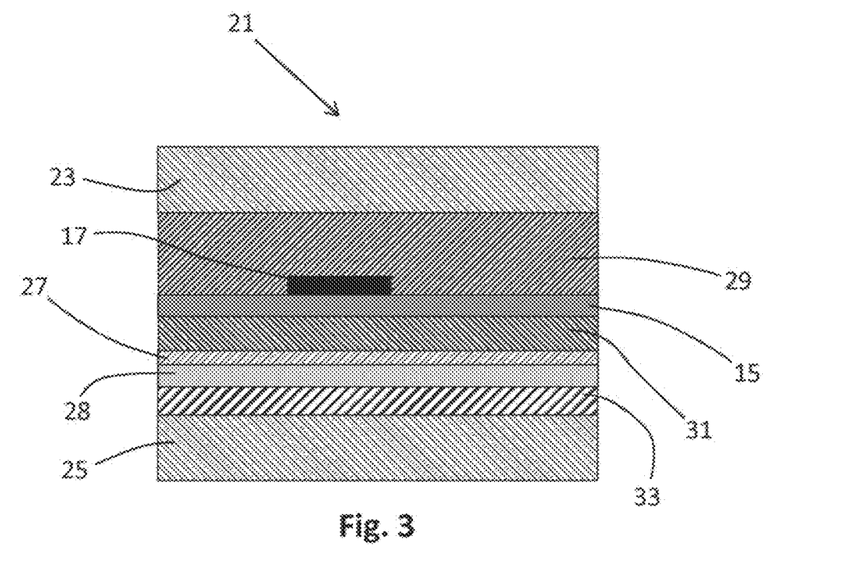
FIG. 3 shows a schematic cross-sectional view of another known laminated glazing incorporating a light emitting diode mounted on a circuit board.
Figure 4:
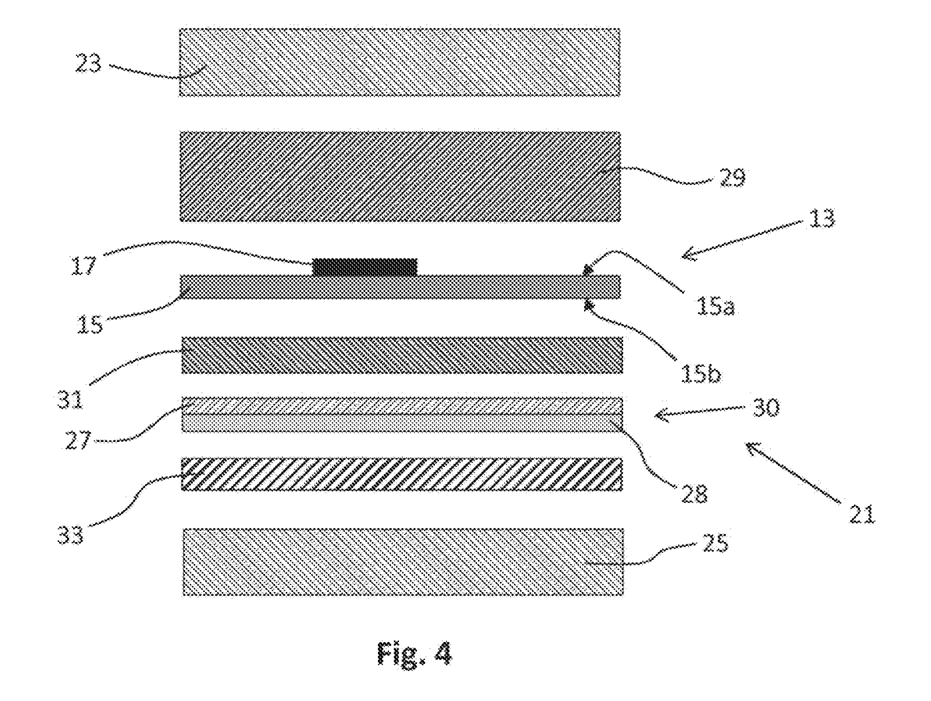
FIG. 4 shows a schematic exploded cross-sectional view of the laminated glazing shown in FIG. 3.

With reference to FIGS. 3 and 4, there is shown a laminated glazing 21 comprising a first pane of glass 23 joined to a second pane of glass 25 by means of an interlayer structure comprising first, second and third plies of PVB 29, 31 and 33. Between the first and second plies of PVB 29, 31 is an electrical device 13 as described above having a light emitting diode 17 mounted on substrate 15.

In between the second and third plies of PVB 31, 33 is an infrared radiation reflecting film 27 on a carrier ply 28 i.e. the infrared radiation reflecting film is a coating on the carrier ply 28. In FIGS. 3 and 4, the coated carrier ply is denoted by the numeral 30 i.e. the coated carrier ply 30 consists of the infrared radiation reflecting film 27 on a major surface of the carrier ply 28. Such a carrier ply provided with a coating comprising an infrared radiation reflecting film thereon is sold commercially by companies including Eastman (www.eastman.com) and 3M (www.3m.com). Examples in the prior art are described in GB2080339B and WO2004/016416A2.

In this example the carrier ply 28 is PET and the infrared radiation reflecting film 27 is a multilayer coating comprising at least one layer of silver.

In order to incorporate the coated carrier ply 30 into the laminated glazing 21 it is necessary to position the coated carrier ply 30 between the second ply of the PVB 31 and the third ply of PVB 33 because the carrier ply 28 and the infrared radiation reflecting film 27 are not adhesive.

Note that in FIGS. 3 and 4, the coated carrier ply 30 may be arranged such that the carrier ply 28 faces the second ply of PVB 31 and the infrared radiation reflecting film 27 faces the third ply of PVB 33.

FIGS. 1-4 are illustrative of laminated glazings known in the art.

Figure 5:
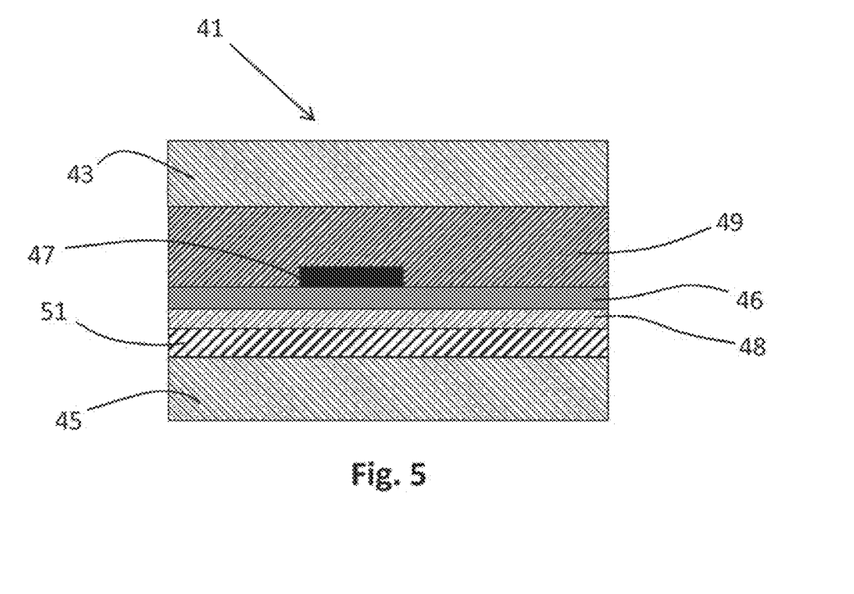
FIG. 5 shows a schematic cross-sectional view of a laminated glazing incorporating a light emitting diode mounted on a circuit board according to the present invention.
Figure 6:
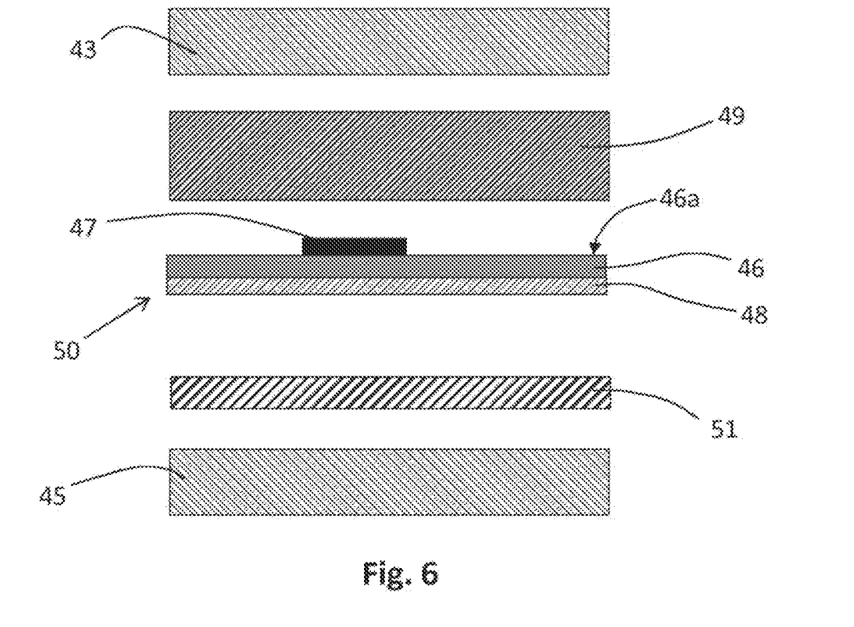
FIG. 6 shows a schematic exploded cross-sectional view of the laminated glazing shown in FIG. 5.

FIGS. 5 and 6 show a laminated glazing 41 in accordance with the present invention.

The laminated glazing 41 comprises first and second glass panes 43, 45 joined by an interlayer structure comprising first and second plies of PVB 49, 51. Between the first and second plies of PVB 49, 51 is an electrical device 50. The electrical device 50 comprises a substrate 46 having a first major surface 46a and an opposing second major surface (not labelled). A light emitting diode 47 (which is the same as light emitting diode 17 previously described) is mounted on the first major surface 46a of the substrate 46. The light emitting diode 47 has a first electrical input and a second electrical input such that upon bringing the first electrical input of the light emitting diode 47 into electrical communication with a first output terminal of a suitable electrical power supply, and bringing the second electrical input of the light emitting diode 47 into electrical communication with a second output terminal of the suitable power supply, electrical power is provided to the light emitting diode to switch the light emitting diode 47 "on" i.e. the light emitting diode goes from an unenergized state wherein no light is emitted by the light emitting diode, to an energised state wherein light is emitted by the light emitting diode.

Electrically conductive pathways as previously described are also on the first major surface 46a in electrical communication with the light emitting diode 47. A first electrically conductive pathway is on and in direct contact with the first major surface 46a, the first electrically conductive pathway being in electrical communication with the first electrical input of the light emitting diode 47. A second electrically conductive pathway is also on and in direct contact with the first major surface 46a, the second electrically conductive pathway being in electrical communication with the second electrical input of the light emitting diode 47. Upon bringing the first electrically conductive pathway into electrical communication with a first output terminal of a suitable electrical power supply and bringing the second electrically conductive pathway into electrical communication with a second output terminal of the suitable power supply, electrical power is provided to the light emitting diode 47 to switch the light emitting diode 47 "on".

The substrate 46 is PET and has a thickness of 0.1 mm.

On the second major surface of the substrate 46 and in direct contact therewith is an infrared radiation reflecting film 48. The infrared radiation reflecting film 48 is a multilayer coating comprising at least one layer of silver.

The first ply of PVB 49 is in direct contact on one side with the first glass pane 43 and in direct contact on the other opposite side with the electrical device 50.

The second ply of PVB 51 is in direct contact on one side with the second glass pane 45 and in direct contact on the other opposite side with the electrical device 50.

As is apparent from FIGS. 5 and 6, the second ply of PVB 51 is in direct contact with the infrared radiation reflecting film that is on the PET substrate 46, the light emitting diode being on the opposite side of the PET substrate 46.

It is preferred that in in the laminated glazing 41 all the individual components are arranged as a congruent stack, other than the electrical device because it is preferred that a portion of the electrical device extends beyond the periphery of the laminated glazing to allow electrical connection to be made to the electrically conductive pathways as will be described in more detail hereinafter. That is, it is preferred that the first glass pane 43 is coextensive with the first ply of PVB 49, that the second pane of glass 45 is coextensive with the second ply of PVB 51, that the first ply of PVB 49 is coextensive with the second ply of PVB 51 and that the electrical device 50 extends between the first and second plies of PVB 49, 51 to provide sufficient rejection of infrared radiation through the laminated glazing 41 whilst ensuring electrical power can still be provided to power the electrical device 50.

Figure 7:
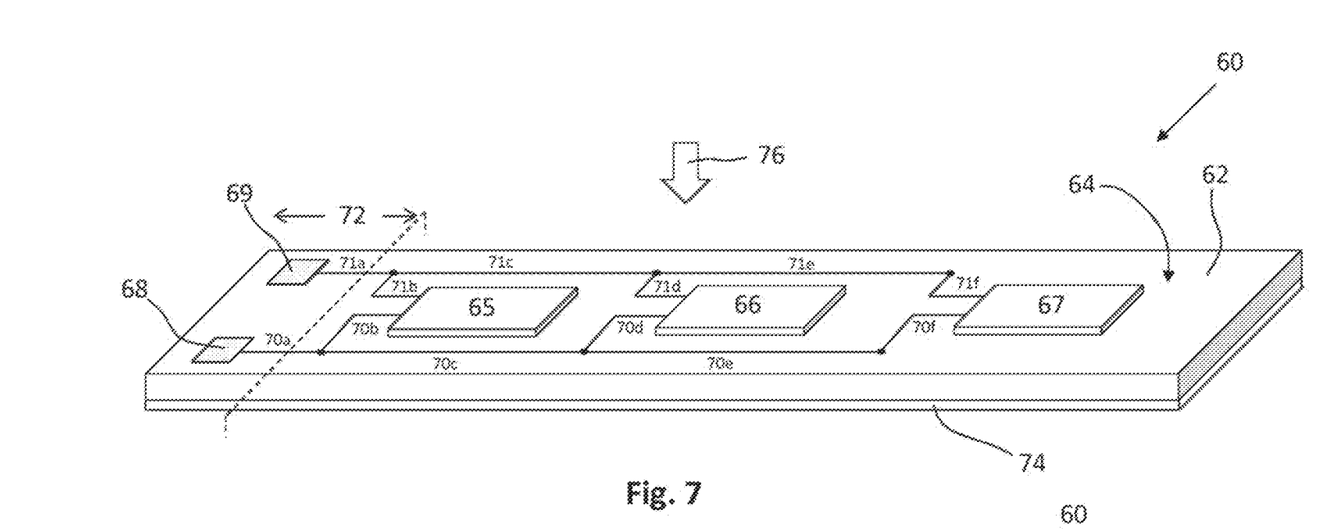
FIG. 7 shows a schematic isometric view of an electrical device in accordance with the present invention.

FIG. 7 shows a schematic isometric representation of an electrical device 60 similar to the electrical device 50 described in relation to FIGS. 5 and 6, the main difference being that the electrical device 60 has three light emitting diodes, and not one, mounted on a substrate.

The electrical device 60 comprises a substrate 62 having a first major surface 64 and an opposing second major surface (not labelled). The substrate 62 is a single sheet of PET which may suitably be cut from a larger sheet of PET as required. The substrate 62 would typically be referred to as monolithic.

Mounted on the first major surface 64 of the substrate 62 are three light emitting diodes 65, 66 and 67. Each light emitting diode may emit light of the same colour i.e. the same wavelengths, or two or more may emit different colour light. At least one of the light emitting diodes 65, 66 and 67 may emit an infrared beam, for example at a wavelength of about 800 nm.

Each light emitting diode 65, 66, 67 has a respective pair of electrical inputs (a first electrical input and a second electrical input) for providing electrical power to the respective light emitting diode as previously described.

Also, on the first major surface 64 is a pair of electrical contacts, a first electrical contact 68 and a second electrical contact 69. The first electrical contact 68 and the second electrical contact 69 may be suitably screen printed using an electrically conductive ink.

The first electrical contact 68 is in electrical communication with the first electrical input of each of the light emitting diodes 65, 66 and 67 via electrically conductive tracks 70a, 70b, 70c, 70d, 70e and 70f.

The second electrical contact 69 is in electrical communication with the second electrical input of each of the light emitting diodes 65, 66 and 67 via electrically conductive tracks 71a, 71b, 71c, 71d, 71e and 71f.

Figure 8:
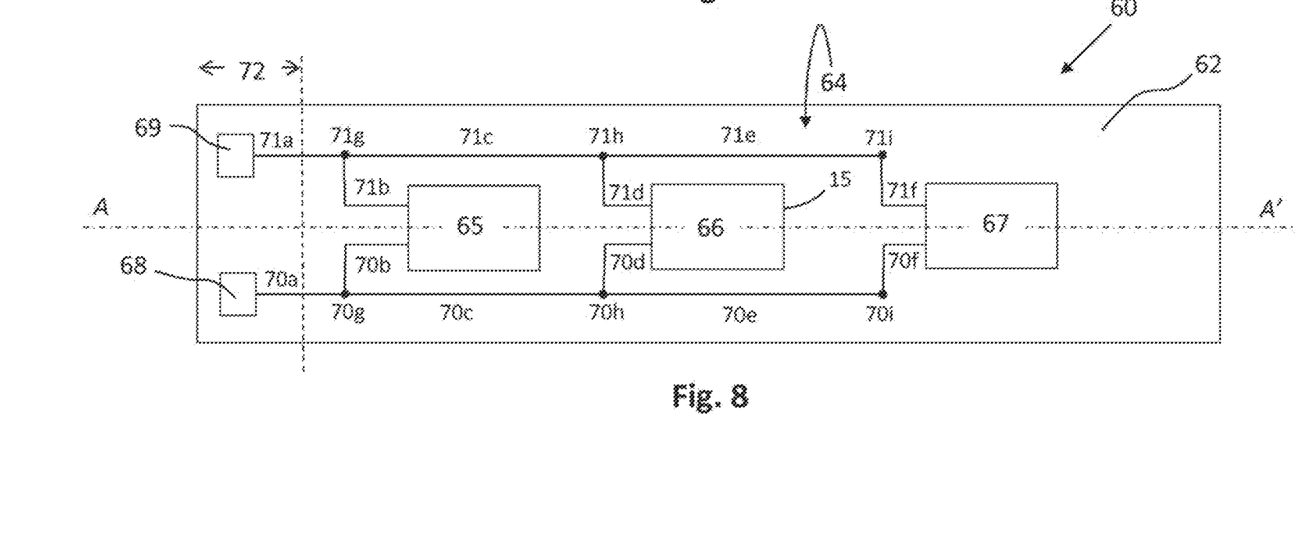
FIG. 8 shows a schematic plan view of the electrical device shown in FIG. 7.

As is evident from FIGS. 7 and 8, the three light emitting diodes 65, 66, 67 are electrically connected in parallel with the pair of electrical contacts 68, 69.

If desired, one or more of the light emitting diodes 65, 66, 67 may be electrically connected in series with the pair of electrical contacts 68, 69.

The pair of electrical contacts 68, 69 are on an end portion 72 of the substrate 62. When the electrical device 60 is incorporated into a laminated glazing, for example of the type shown in FIG. 5, the end portion 72 is not located between the first and second plies of PVB 49, 51 or the first and second panes of glass 43, 45 so that a suitable power supply may be electrically connected to the pair of electrical contacts 68, 69 to provide electrical power to the light emitting diodes 65, 66, 67.

On the second major surface of the substrate 62 is a coating 74 comprising an infrared radiation reflecting film. The coating is in direct contact with the second major surface of the substrate 62. In an alternative embodiment to that shown, there may be an intermediate coating on the second major surface of the substrate 62, and the coating 74 is disposed on the intermediate coating on the second major surface of the substrate 62. An intermediate coating on the second major surface of the substrate may be used to provide the second major surface of the substrate with other properties prior to the coating 74 being disposed thereon.

The electrical device 60 may be made in different ways.

It is preferable to use a substrate 62 that already has an infrared radiation reflecting film on a major surface thereof (i.e. in direct contact with a major surface of the substrate), and then to print onto the uncoated side of the substrate the electrically conductive pathways using a suitable electrically conductive ink such that the electrically conductive pathways are in direct contact with the previously uncoated side of the substrate. Each light emitting diode may then be mounted onto this surface and the electrical inputs thereof can be electrically connected to the electrically conductive pathways using an electrically conductive adhesive. As mentioned above, suitable carrier films provided with a coating comprising an infrared radiation reflecting film thereon are commercially available.

In a first alternative, a sheet of PET with no coatings on either major surface thereof may be used to make the electrical device. The electrically conductive pathways may first be printed onto one major surface of the sheet of PET, followed by depositing the infrared reflecting film onto the opposite major surface of the sheet of PET. The electrical inputs of the light emitting diodes may then be electrically connected to the electrically conductive pathways and mounted onto the sheet of PET.

In a second alternative, which has essentially the same steps as the first alternative, following the printing of the electrical conductive pathways on one major surface of the sheet of PET, the electrical inputs of the light emitting diodes are electrically connected to the electrically conductive pathways and mounted to the sheet of PET. Thereafter the infrared reflecting film is deposited onto the other major surface of the sheet of PET not having the electrically conductive pathways thereon.

FIG. 8 is a plan view of the electrical device 60 i.e. when viewed in the direction of arrow 76 shown in FIG. 7.

As shown in FIG. 8, the electrically conductive pathway 70a is in electrical communication at one end with the first electrical contact 68 and at the other end with electrically conductive node 70g.

The electrically conductive pathway 70b is in electrical communication at one end with the first electrical input of the light emitting diode 65 and at the other end with electrically conductive node 70g.

The electrically conductive pathway 70c is in electrical communication at one end with the electrically conductive node 70g and at the other end with electrically conductive node 70h.

The electrically conductive pathway 70d is in electrical communication at one end with the first electrical input of the light emitting diode 66 and at the other end with electrically conductive node 70h.

The electrically conductive pathway 70e is in electrical communication at one end with the electrically conductive node 70h and at the other end with electrically conductive node 70i.

The electrically conductive pathway 70f is in electrical communication at one end with the first electrical input of the light emitting diode 67 and at the other end with electrically conductive node 70i.

The electrically conductive pathway 71a is in electrical communication at one end with the second electrical contact 69 and at the other end with electrically conductive node 71g.

The electrically conductive pathway 71b is in electrical communication at one end with the second electrical input of the light emitting diode 65 and at the other end with electrically conductive node 71g.

The electrically conductive pathway 71c is in electrical communication at one end with the electrically conductive node 71g and at the other end with electrically conductive node 71h.

The electrically conductive pathway 71d is in electrical communication at one end with the second electrical input of the light emitting diode 66 and at the other end with electrically conductive node 71h.

The electrically conductive pathway 71e is in electrical communication at one end with the electrically conductive node 71h and at the other end with electrically conductive node 71i.

The electrically conductive pathway 71f is in electrical communication at one end with the second electrical input of the light emitting diode 67 and at the other end with electrically conductive node 71i.

The electrically conductive pathways 70a, 70b, 70c, 70d, 70e, 70f, 71a, 71b, 71c, 71d, 71e and 71f and the electrically conductive nodes 70g, 70h, 70i, 71g, 71h, 71i are all in direct contact with the first major surface 64 of the substrate 62. It is also preferred that the first electrical contact 68 and the second electrical contact 69 are in direct contact with the first major surface 64 of the substrate 62.

The electrically conductive pathways 70a, 70b, 70c, 70d, 70e, 70f, 71a, 71b, 71c, 71d, 71e and 71f and the electrically conductive nodes 70g, 70h, 70i, 71g, 71h, 71i may all be printed in the same printing operation with the same electrically conductive ink.

The first electrical contact 68 and the second electrical contact 69 may be suitably screen printed using the same electrically conductive ink as used to screen print the electrically conductive pathways and/or electrically conductive nodes. It is also preferred that the first electrical contact 68 and the second electrical contact 69 are printed in the same printing operation used to print the electrically conductive pathways and/or electrically conductive nodes.

In an alternative to the embodiment shown in FIGS. 7 and 8, there are no electrically conductive nodes, but the electrically conductive tracks are still in electrical communication as described above.

Figure 9:
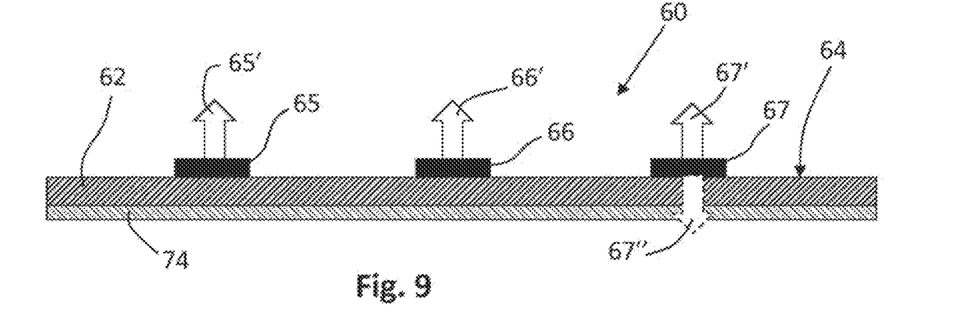
FIG. 9 shows a schematic cross-sectional view of the electrical device shown in FIGS. 7 and 8.

FIG. 9 is a schematic cross-sectional view of the electrical device 60 viewed along the line A-A' of FIG. 8.

The light emitting diode 65 is arranged to emit a beam of light in the direction of arrow 65'. The light emitting diode 66 is arranged to emit a beam of light in the direction of arrow 66'. The light emitting diode 67 is arranged to emit a beam of light in the direction of arrow 67'.

Any or all of the light emitting diodes 65, 66, 67 may be arranged to emit a beam of light in the opposite direction. This is illustrated for light emitting diode 67 showing (in phantom) a beam of light in the direction of arrow 67" i.e. passing through the thickness of the substrate 62 and the infrared reflecting film 74.

Although only three light emitting diodes are shown in FIGS. 7-9, there may be more than three light emitting diodes or there may be only one or two light emitting diodes mounted on the first major surface 64 of the substrate 62.

Figure 10:
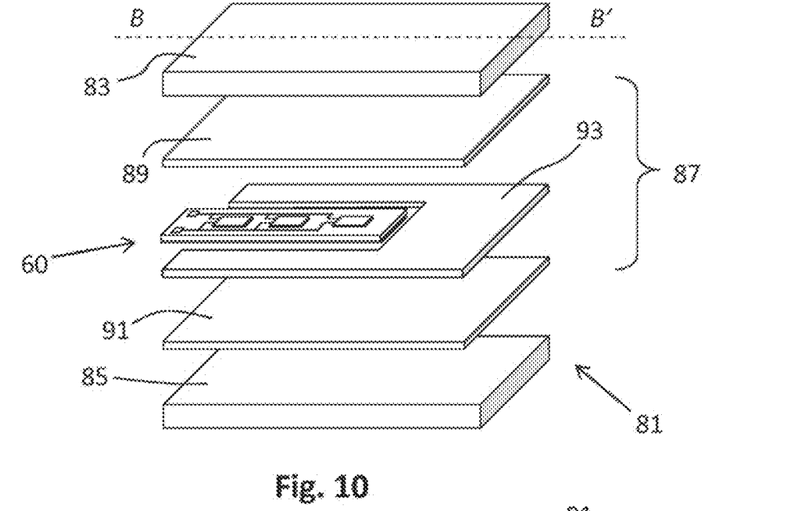
FIG. 10 shows a schematic isometric exploded view of a laminated glazing in accordance with the present invention.
Figure 11:
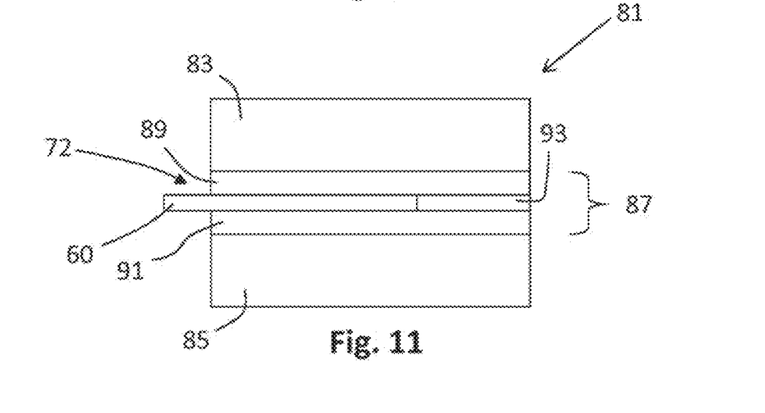
FIG. 11 shows a schematic cross-sectional view of the laminated glazing shown in FIG. 10.

FIG. 10 shows a schematic exploded perspective view of another laminated glazing 81. FIG. 11 shows a schematic cross-sectional view of the laminated glazing 81 of FIG. 10 through the line B-B'. In this example the laminated glazing 81 comprises a first glass pane 83 joined to a second glass pane 85 by means on an interlayer structure 87. The interlayer structure 87 consists of three plies of adhesive interlayer material (i.e. PVB, EVA or combinations of plies thereof) 89, 91 and 93. The first ply of adhesive interlayer material 89 is coextensive with the first glass pane 83. The second ply of adhesive interlayer material 91 is coextensive with the second pane of glass 85. The third ply of adhesive interlayer material 93 is located between the first and second plies of interlayer material 89, 91 and has a cut-out region therein to accommodate the electrical device 60. The cut-out region is along one edge of the third ply of adhesive interlayer material and the other three edges thereof are aligned with the respective edges of the first and second plies of adhesive interlayer material.

FIG. 10 is representation of the stack of unlaminated components that may be laminated together using conventional lamination processes, for example using suitably high temperature and pressure, to produce the final laminated glazing 81.

In the final laminated glazing 81 as shown in FIG. 11, the electrical device 60 is between the first and second plies of adhesive interlayer material 89, 91 and is located in the cut-out region of the third ply of adhesive interlayer material 93. Such a construction makes lamination simpler as the extra third ply of adhesive interlayer material (compared to a two-ply adhesive interlayer structure) makes it easier to accommodate the thickness of the electrical device 60 in between the first and second plies of adhesive interlayer material.

In the final laminated glazing 81 the first ply of adhesive interlayer material 89 is adjacent to and in direct contact with the first glass pane 83 and the second ply of adhesive interlayer material 91 is adjacent to and direct in contact with the second glass pane 85. The third ply of adhesive interlayer material 93 is in direct contact with both the first and second plies of adhesive interlayer material 89, 91.

FIG. 11 is a schematic cross-sectional representation through the line B-B' in FIG. 10 and illustrates how the portion 72 extends beyond the periphery of the laminated glazing 81 such that electrical power may be supplied to the electrical device 60 via the electrical contacts 68, 69.

At least one of the first, second and third plies of adhesive interlayer material 89, 91, 93 may be PVB or EVA.

Figure 12:
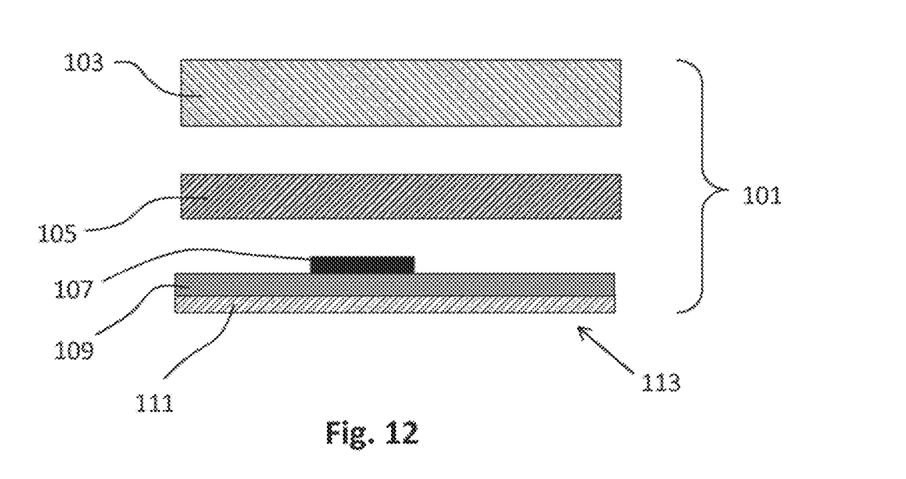
FIG. 12 shows a schematic exploded cross-sectional view of a glazing pane in accordance with the present invention.

FIG. 12 shows an exploded cross-sectional view of a glazing pane 101 comprising an electrical device 113 of the type described with reference to FIGS. 7-9, except in this example the electrical device has only one light emitting diode, and not three.

The glazing pane 101 comprises a glass pane 103, a ply of adhesive interlayer material 105, such as PVB or EVA, and an electrical device 113.

The electrical device 113 is fixed to the glass pane 103 by means of the ply of adhesive interlayer material 105.

The electrical device 113 consists of a PET substrate 109 having on one side a light emitting diode 107 and associated electrically conductive pathways, and on the other side an infrared radiation reflecting film 111.

In FIG. 12, the light emitting diode is arranged to be between the glass pane 103 and the substrate 109, but the electrical device 113 may be configured to face the opposite way such that the infrared radiation reflecting film 111 is between the ply of adhesive interlayer material 105 and the PET substrate 109.

Although in FIG. 12 only one ply of adhesive interlayer material 105 is present in the glazing pane 101, there may be two or more plies of adhesive interlayer material, one ply of adhesive interlayer material adjacent to and in direct contact with the glass pane 103 and a second ply of adhesive interlayer material adjacent to and in direct contact with the electrical device 113.

Figure 13:
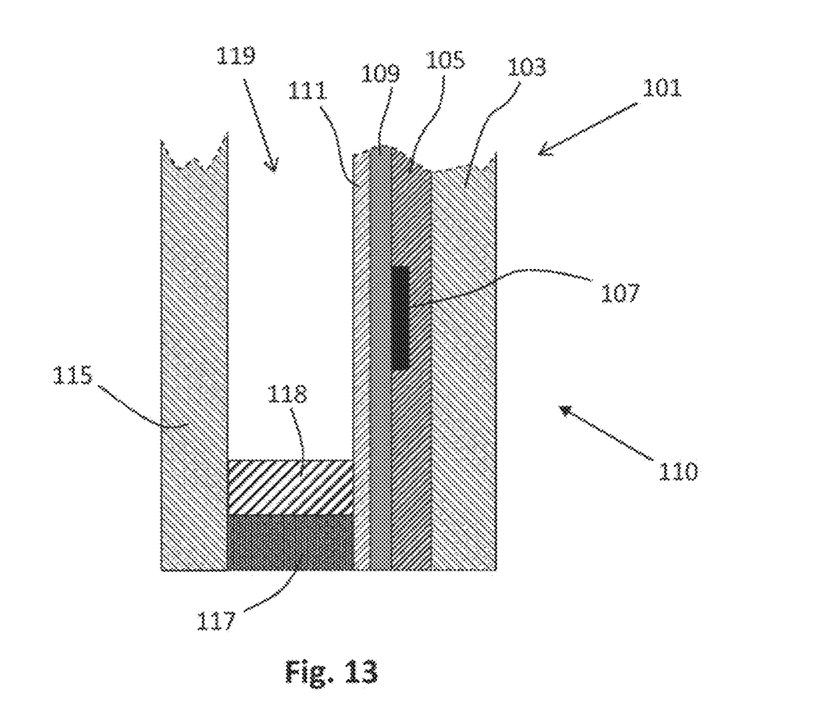
FIG. 13 shows a schematic cross-sectional view of a double glazed unit pane in accordance with the present invention.

FIG. 13 shows a schematic cross-sectional view of a portion of a double glazing unit 110 comprising the glazing pane 101 of FIG. 12. As is known in the art, a double glazing unit is often referred to as an insulated glazing unit, or an IGU for short. IGUs are known with two or more glazing panes with an airspace between opposing panes.

The double glazing unit 110 comprises the glazing pane 101 spaced apart from glazing pane 115 by a perimeter seal 117 to define an air space 119. A spacer bar 118 may also be provided adjacent to the peripheral seal 117 to help maintain the spacing of the glazing panes 101, 115.

The glazing pane 115 may be glass and may be thermally toughened.

Although in the previous figures the laminated glazings are shown as being flat (or planar), it is within the scope of the present invention to provide a laminated glazing that is curved in at least one direction. Preferably the radius of curvature in the at least one direction is between 500 mm and 20000 mm, more preferably between 1000 mm and 8000 mm.

In the preceding examples where glass panes were described, a suitable glass composition for the glass panes is a soda-lime-silica glass composition. A typical soda-lime-silica glass composition is (by weight), $SiO_2$ 69-74%; $Al_2O_3$ 0-3%; $Na_2O$ 10-16%; $K_2O$ 0-5%; $MgO$ 0-6%; $CaO$ 5-14%; $SO_3$ 0-2%; $Fe_2O_3$ 0.005-2%. Such a glass may be manufactured using the float process.

Other glass compositions may be used, for example borosilicate glass.

Furthermore, any or all of the glass panes in the preceding examples may be replaced by panes of other types of glazing material, for example plastic material such as polycarbonate.

In addition, although the above examples use light emitting diodes emitting light in the visible region of the electromagnetic spectrum (wavelengths in the range 380 nm to 780 nm), light emitting diodes which emit in other regions of the electromagnetic spectrum, for example infrared or ultra violet, may be used.

The present invention provides particular advantage when a glazing requiring both solar control and an illumination function is required. By incorporating an electrical device as hereinbefore described, a solar control function may be provided to a glazing and less heat may be incident upon the illumination device. Less plies of adhesive interlayer material are required compared to using conventional solar control films on carrier plies because the same substrate may be used to carry both the electrical device (or devices) on one side thereof and on the opposite side the infrared radiation reflecting film, thereby providing an advantage that thinner (and therefore less heavy) laminated glazings may be produced.

The invention claimed is:

1. An electrical device comprising:
   a substrate having a first major surface and a second opposing major surface;
   at least two electrically conductive pathways directly on the first major surface of the substrate and in electrical communication with at least two electrical inputs of at least one electrically operable light source on the substrate, the at least one electrically operable light source on the substrate being a first electrically operable light source on the substrate; and
   an infrared radiation reflecting film on at least a portion of the second major surface of the substrate, the infrared radiation reflecting film configured to reduce the amount of infrared radiation that passes from the second major surface of the substrate to the first major surface of the substrate,
   wherein the at least two electrically conductive pathways include a first electrically conductive pathway and a second electrically conductive pathway arranged such that upon electrically connecting the first and second electrically conductive pathways to a power supply, the first electrically operable light source switches on.

2. An electrical device according to claim 1, wherein the substrate is monolithic.

3. An electrical device according to claim 1, wherein the substrate comprises a polyester.

4. An electrical device according to claim 1, wherein the infrared radiation reflecting film comprises at least one layer comprising a metal.

5. An electrical device according to claim 1, wherein the infrared radiation reflecting film comprises one or more metallic layers and one or more dielectric layers.

6. An electrical device according to claim 1, wherein the infrared radiation reflecting film comprises one or more metal oxide layers and one or more dielectric layers.

7. An electrical device according to claim 1, wherein the infrared radiation reflecting film comprises a plurality of non-metallic layers.

8. An electrical device according to claim 1, wherein the first electrically operable light source is mounted on the first major surface of the substrate.

9. An electrical device according to claim 1, wherein the infrared radiation reflecting film is in direct contact with the second major surface of the substrate.

\* \* \* \* \*